Patented May 8, 1951

2,552,129

UNITED STATES PATENT OFFICE 2,552,129

TANNING WITH A FREE ALDEHYDE AND A FREE POLYHYDRIC PHENOL MIXTURE IN A MOLECULAR RATIO OF AT LEAST 2 TO 1

Wallace Windus, Bristol, Pa., assignor to John R. Evans & Company, Camden, N. J., a corporation of New Jersey No Drawing. Application May 11, 1946, Serial No. 669,101

6 Claims. (Cl. 8—94.24)

The present invention relates to improvements in tanning, particularly as applied to tannable protein materials such as hides, skins, pelts and keratinous products, as well as to protein artifacts such as casein filaments, films, and the like.

The process involves the use of certain polyhydric phenols in conjunction with certain aldehydes capable of reacting therewith to form condensation products.

It has already been proposed to tan certain proteins by means of water-soluble condensation products of phenols and aldehydes, the so-called "Syntans" being characteristic of this type of endeavor. It has also been proposed to impregnate already tanned material, such as leather, with potential resin-forming reagents, and to effect the formation of the resins within the interstices of the leather. Leather has also been impregnated and coated with solutions or dispersions of hardenable but still soluble resinous synthetics, which were then insolubilized or "cured" within and/or upon the leather.

The present invention, however, differs from such prior practices in employing certain polyhydric phenols and certain aldehydes simultaneously, but in their free and uncombined condition, to effect the tanning of tannable proteins.

Among the polyhydric phenols employable in the processes of the present invention are the dihydroxy and trihydroxy derivates of benzene, and their substitution products. Particularly useful are resorcinol and substituted resorcinol, and pyrogallol and its derivatives.

The aldehydes may be those selected from the group consisting of formaldehyde, polymers of formaldehyde, acetaldehyde, crotonaldehyde, benzaldehyde and furfural.

It has also been found that the hydrogen-ion concentration of the aqueous medium in which the tanning is effected is a critical one, and that the medium should be strongly acid, for instance, within the range of about pH 0.3 to about pH 3.0.

The tannage is effected in such a medium by the conjoint presence of both the polyhydric phenol and the aldehyde. The reaction appears definitely to be much more than the mere effect of mutual condensation, as the protein material is so drastically affected that its participation in the reaction is established. The exact nature of the reaction products obtained is not known, but the properties of the leather produced are such that a great improvement in its qualities, particularly as regards its shrink test at or near the boiling point of water, is in evidence.

It has also been ascertained that it is necessary to use more than mol equivalents of the polyhydric phenol and the aldehyde. In fact, the optimum results are obtained when using three or more mols of the aldehyde to each mol of the polyhydric phenol. Up to six mols of the aldehyde may be used to advantage. This is in distinct contrast with the ratios employed in the production of synthetic resins from polyhydric phenols and aldehydes, where an excess of the said phenols is usually employed.

The amount of polyhydric phenol, relative to the tannable material treated, is about from 1% to about 10%, based on the wet weight of the material, for instance well drained pickled skins. The most useful range lies between about 2% and about 5%, depending somewhat upon the type of tannable material used, and the properties desired in the tanned product.

All polyhydric phenols are not suitable; in fact careful research has developed the quite unexpected fact that of the dihydric phenols only the meta-hydroxy derivative of benzene, known as resorcinol, is effective. The ortho derivative, catechol, and the para-derivative, hydroquinone, yield entirely negative results. Of the trihydroxy derivatives of benzene, only pyrogallol is effective; while gallic acid is entirely ineffective. The monohydric phenols, such as phenol itself, and α- and β-naphthol, are also ineffective. This would definitely indicate that the effect is not one of mere formation of resinous materials within the tannable material, but that the tanning accomplished is a result of a reaction involving the protein itself. On the other hand, derivatives of resorcinol and of pyrogallol, where the substituting groups are attached to the nuclear ring, are useful in the present process. Thus the resorcinol may be replaced wholly or in part by hexylresorcinol, tertiary octyl resorcinol, benzylresorcinol, phenylresorcinol, methoxyresorcinol, etc.

Among the aldehydes, formaldehyde is the preferred one; although polymers of formaldehyde, acetaldehyde, crotonaldehyde, benzaldehyde and furfural all work well with resorcinol. Benzaldehyde and crotonaldehyde, however, do not work very well with pyrogallol. Ketones, which might be expected to work with the polyhydric phenols, were found to be quite ineffective. The most effective combination is resorcinol and formaldehyde, when used in an acid medium having a pH of from about 0.3 to 3.0.

The advantages attainable by the practice of the present invention will be elaborated upon after the disclosure of a number of representative working examples. In these examples, the weight of the material to be tanned (e. g. skins, pelts, kips, etc.), is the wet weight of the material after it has been horsed up and well drained. Also, the examples are given in connection with skins, etc., that have been properly pickled in accordance with well known tannery practice. Except as otherwise noted, the operations were carried out in a drum or churn.

*Example 1.*—A 50 pound pack of seven pig skins (wet weight, pickled, after horsing and draining, as above explained) was treated as follows:

2.5 pounds of sodium chloride were dissolved in 6 gallons (50 pounds) of water at 75° F. in a drum. The skins were put into the drum and agitated in the salt solution for ten minutes. The hydrogen-ion concentration of the liquor at this stage was pH 2.3 and the temperature 73° F. There were then added to the contents of the drum separately, but at the same time, 3.5 pounds of resorcinol and 7 pounds of commercial formalin containing 36% to 37% actual HCHO. The skins were then run in this solution in the drum for two hours, at the end of which the pH was found to be 2.4. The acidity of the solution was then increased (i. e. the pH lowered in numerical value) to a pH of 1.0, by the addition of 355 grams of concentrated sulfuric acid diluted with water, the addition being in several increments over a period of five hours, with constant running of the drum. This relatively large amount of acid was necessitated by the fact that the wood of which the drum was constructed exercised a neutralizing effect upon the acid. In subsequent similar runs, it was found that less acid could be used, provided that a sufficiently low pH was attained. The drum containing the skins was run for a further period of two hours after all the acid had been added, and then allowed to remain at rest over night. The next morning the drum was run for thirty minutes. The pH of the liquor was then 1.3. Shrink tests on samples of the tanned skins were, respectively, 181° F., 182° F., and 182° F. The skins were then gradually neutralized in the drum over a period of two hours to a pH of 4.3 by means of 1.5 pounds of sodium acetate for the first feed, and two feeds of sodium bicarbonate totalling 0.75 pound, while the drum was constantly in motion. The shrink tests on two pieces from different skins were then respectively 198° F. and 203° F. The drum was shut down during the noon hour, whereafter the pack therein was washed for ten minutes at 90° F., and another ten minutes at 120° F., thereafter drained, and the tanned skins fat liquored with a mixture of 1 pound of raw cod oil and 0.75 pound of sulfated cod oil in 6 gallons of water at 120° F. The exhaustion of the fat liquor was complete. Samples of the leather then taken showed shrink temperatures of 201° F. The leather was full, round, mellow, tight and strong. The character of the grain was unusual in having a rich unctuous feel totally lacking the harsh woody feel often obtained on similar skins when employing the usual vegetable tanning processes of the past.

In the above examples the primary function of the salt (sodium chloride) employed is to prevent swelling of the skins under the influence of the relatively high acidic aqueous tanning medium.

*Example 2.*—A 10 pound (wet drained weight) pack of degreased, shaved and pickled sheepskins were tanned as follows, the weights given being on the basis of the wet weight of the skins, which is considered as 100%: The said skins were run in a churn for fifteen minutes, in approximately 160% of water (that is to say 1.6 times as much by weight of water on the wet weight of the skins). The amount of water required was approximately two gallons, which also contained 20% of sodium chloride (2 pounds, or 1 pound to each gallon of water). After the skins had been treated in the salt water for the stated period of fifteen minutes, there were then added 7.5% of resorcinol and 11.2% of formalin (36% to 37% actual HCHO), these materials being added simultaneously but separately to the liquor in which the skins were being treated. The churn was then operated for a period of two hours, at which time the hydrogen-ion concentration of the liquor was found to be pH 2.5. The liquor was then acidified by the addition of 200 cc. of concentrated hydrochloric acid previously mixed with 1000 cc. of water, this being added in two feeds with constant running of the churn. The addition of this acid lowered the pH to about 1.1, the time required for the addition of the acid being about two hours. The skins were then allowed to rest in the churn overnight. On the following morning, after operating the churn for thirty minutes, it was found that the acidity of the liquor was equal to pH 0.9, and the shrink test of a sample of the leather was 163° F. The skins were then neutralized in the churn by the addition of a total of 3% of sodium acetate and 3% of sodium bicarbonate, enough of these materials being employed to increase the pH to about 4.5. A sample of the leather then taken and tested was found to have a shrink test of 190° F. The skins were then washed and fat-liquored with a mixture of raw as well as sulfated neat's-foot oil. The leather was excellent and had properties similar to those given in connection with Example 1. It will be noted that in the present example the ratio of formaldehyde to resorcinol, each on 100% basis, (that is to say on the wet weight of skin treated), is 2:1. Furthermore, in this example hydrochloric acid was used for acidification instead of the sulfuric acid used in connection with Example 1.

In the examples to follow, an abbreviated method of description is given inasmuch as the operations were quite similar except that the type of skins or pelts used would vary and the operations would be slightly changed but were within the skill of those who are familiar with this art and the information given is believed to be sufficient for reproduction by a skilled tanner.

*Example 3.*—Material: 10 pounds (wet weight) of unshaved, drained, pickled horse shanks. Treating liquor: 166% water, 20% sodium chloride, 7.5% resorcinol, 17% formalin. Running time: two hours, at the end of which the pH was 2.2. 175 cc. of hydrochloric acid was then added in two increments within a period of two hours, lowering the pH to 1.0; the churn was then run all night. The pH on the following morning was 1.3; shrink test 176° F.; skins then neutralized with 5% sodium acetate of a pH of about 4.3; shrink test then 199° F. Skins were then washed and fat-liquored. Leather obtained: uniform light tan color. Ratio of formaldehyde to resorcinol was approximately 3:1.

*Example 4.*—Material employed: 10 pound pack (wet weight) unshaved pickled horsehide and 2 pickled goat skins. Tanning liquor: 1 gallon (83%) of water, 1 pound (10%) sodium chloride, 12 ounces (7.5%) resorcinol; 27 ounces (17%) formalin. Running time: two hours, which suffices to take up all the liquor. Pack allowed to rest in equilibrium with contained liquor overnight. The following morning after running the churn for thirty minutes, sufficient liquor was squeezed from the treated horsehide and goat skins, and its acidity determined, being found as pH 2.1. Shrink test on leather at that time 176° F. Liquor then warmed up and acidified to speed up the tanning by adding 1 ounce (0.63%) of oxalic acid dissolved in 1 gallon (83%) of water having a temperature of 160° F. Churn then run one hour, dropping temperature to 90° F. with a pH of 1.5. Liquor then reheated to 140° F. and a further addition of 2 ounces (1.26%) of oxalic acid made; and the churn run an additional hour at which time the temperature was 94° F. and pH 1.2. An additional two ounces of oxalic acid was then added directly to the liquor in two separate feeds to bring the pH to 0.9. After a total additional running of two and one-half hours, the hides and skins then had a pink cast and were definitely fuller. Shrink test on a sample then taken was 176° F. The pack was neutralized with ½ pound (5%) of sodium acetate and ½ pound (5%) of sodium bicarbonate to bring pH of liquor to 5.6. Pack then washed and fat-liquored. Shrink test of horsehide, two samples, respectively 190° F. and 201° F. Shrink temperatures of goat skins, 212° F.

*Example 5.*—10 pounds of drained, pickled goat skins; tanning liquor: 2 gallons (160%) of water, 1 pound (10%) sodium chloride, ½ pound (5%) resorcinol, 1 pound 2 ounces (11%) formalin; pH of liquor after one hour running was 2.1; then lowered to pH of 1 by addition of 100 cc. concentrated HCl; churn then run all night. Next morning, pH of liquor was 1.6; shrink test on pieces taken respectively from necks and butts of four skins then was 174° F., 178° F., 178° F., 178° F. Skins then neutralized with sodium acetate, bleached with oxalic acid to remove coloration from iron salts in the water. Washed and fat-liquored. Shrink test on all pieces 206° F. Leather was dried by pasting and finished into a commercially satisfactory lining leather.

*Example 6.*—Raw materials: 10 pounds of degreased shaved pickled sheepskins. Tanning liquor: 6% resorcinol, 9% formaldehyde, 166% water, 20% sodium chloride; pH after one hour 1.7; 50 cc. of concentrated sulfuric acid added in one feed; pH after one hour 0.7; left overnight with churn still. The pH on following morning 0.5; shrink test 183° F. Pack neutralized with sodium acetate and bicarbonate to pH of 4.0; run one hour thereafter; washed, fat-liquored and dried. Shrink test 192° F. Leather full, round, tight, mellow, and strong. Ratio of resorcinol and formaldehyde, 1 mol to 2 mols.

*Example 7.*—Raw material, hair-on belting-leather, in the form of 10 pounds of strips cut from the butts of kips after soaking, and pickled in a churn to a uniform pH on a cut of the skin to about 3.0, as measured by an indicator. The liquor then had a pH of 2.7. To this pickle liquor was then added 8 ounces (7½%) of resorcinol and 18 ounces (17%) of formalin. The liquor of course already contained the salt used in the pickling. The churn was run all day, the pH thereof remaining uniform at 2.7. Next morning the pH of the liquor was 2.8 and that of a cut on the skin from 2.5 to 3, and the shrink test 170° F. Churn then run until afternoon of the same day, whereupon pH was lowered to 1.0 by addition of a total of 25 cc. of concentrated sulfuric acid added in two separate portions, and the churn then run a part of the night; pH on the following morning 1.2; shrink test 188° F. The kips were then neutralized until the liquor had a pH of 4.0 using sodium acetate, followed by a three hour run at that pH; shrink test then 196° F. The pieces were washed, and horsed over the week end; then swabbed with oil and hung up to dry. The dry hair-on belting-leather had a good feel, was pliable, strong and well tanned.

*Example 8.*—This example demonstrates a very rapid reaction at a low pH. Raw materials used: 10 pounds of pickled goat skins, sorted for crushed grain leather. Tanning liquor was used at 75° F., and consisted of 2 gallons of water, 2 pounds sodium chloride, 12 ounces of resorcinol, 24 ounces of formalin. Initial running time thirty minutes, when pH was 1.9, and a pH of the cut also uniform; 50 cc. of concentrated sulfuric acid in one quart of water at 75° F. then added, and churn run for a further thirty minutes. The pH of liquor was then 0.7 and uniform on the cut. Additional 25 cc. concentrated sulfuric acid in 1 quart of water at 75° F. then added, and run continued for another thirty minutes. pH then 0.5. After a further hour's running, pH had risen to 0.6 which was corrected by the addition of a further quantity of 10 cc. of concentrated sulfuric acid added directly to the liquor. Churn then run all day and pH checked periodically and found to remain constant at 0.5. An additional 10 cc. of sulfuric acid was then added and the churn allowed to remain over night, the churn being operated during a part of the night. Next morning the pH of the liquor was 0.6 and shrink tests on three pieces of different skins were respectively 203° F., 203° F., and 203° F. The skins were neutralized during a period of one hour with sodium acetate at the end of which time the pH of the liquor was 4.1, and the pieces were tanned so well that they would withstand a five minute boiling test. The skins were then washed, fat-liquored, and finished to a brown crushed grain leather, which was commercially satisfactory.

*Example 9.*—This was run in a small laboratory reel instead of in a churn or drum. Raw material: 10 pounds of unshaved pickled horse shanks. Tanning liquor: 20 gallons of water, 20 pounds of salt, 1 pound of resorcinol, 2 pounds of formalin. Horsehide then entered and paddle operated for one hour, at end of which pH of liquor was 3.0. The pH was then lowered to 1.2 by the addition, over a period of three hours with constant running of the paddle, of 100 cc. of concentrated sulfuric acid, whereafter the pack was allowed to rest without agitation over night. On the following morning the pH was 1.2, and the shrink test 154° F. The liquor was somewhat turbid, indicating the presence of a white precipitate which may have been caused by a small amount of external polymerization. The horsehide, however, felt as though it were tanned. The hides were then neutralized as usual with sodium acetate and sodium carbonate, and allowed to rest in the liquor over a three day period. At the end of this time the pH of the liquor was 4.5, and the shrink tests on three different samples were uniform at 194° F. The resulting leather was found to be well tanned and full.

*Example 10.*—This was also carried out in a reel. Raw material: 25 pounds of well drained, unshaved, pickled horse shanks. Tanning liquor 20 gallons of water, 20 pounds of salt, 2.5 pounds of resorcinol, 5 pounds of formalin. At the end of three hours the pH was 2.2 and the pack was allowed to rest in this liquor over night. Next morning, the liquor still had a pH of 2.2 and there was no visual evidence of condensation, and the liquor was clear and colorless, and the pieces of horse shanks were white. The pack was paddled for one hour and allowed to set until the next day, at which time the shrink test was 180° F. and the pH still 2.2. The pack was allowed to rest over a week end (three days) and then neutralized with sodium acetate to a liquor pH of 4.7, at which time the shrink tests of samples removed were 187° F. The pieces of horsehide were than allowed to remain in the liquor for another day, and then washed and fat-liquored in a churn. The leather was well tanned and quite full.

Example 11.—This is an example of the application of the present invention of a fur-type of skin, such for example as that of a sheep, and which might be used for the manufacture of an imitation fur, or for the treatment of any furskin. Raw materials used: two well drained pickled lamb shearlings weighing 6.5 pounds. Tanning liquor (in a reel): 15 gallons of water, 7.5 pounds salt, 5 ounces resorcinol, 10 ounces formalin. The paddle was run for fifteen minutes, and the reel then allowed to remain quiet. After one hour the pH was 3.1. This was then lowered to 1.5 by the addition of 50 cc. of concentrated sulfuric acid previously dissolved in 1000 cc. of water. The paddle was then again run for fifteen minutes, and the shearlings allowed to set in the liquor over night. The next day the pH of the liquor was still 1.5; a shrink test on the shearlings was 150° F. The shearlings were then paddled for fifteen minutes, both during the morning and again in the afternoon, and once again allowed to set over night. The next morning the pH of the liquor was still 1.5, but the shrink test on the shearlings had risen to 168° F. The pH of the liquor was then again lowered by the addition of 125 cc. of concentrated sulfuric acid mixed with water, and added in three increments until the pH was 1.1. The temperature of the liquor was raised to 80° F. from 70° F. The next morning the pH of the liquor was 0.9 and the shrink test 168° F. The skins and liquor were then neutralized to a pH of 4.5 by the addition of a total of 10 ounces of sodium acetate and 10 ounces of sodium bicarbonate. The shearlings were then hauled, horsed until the next day, swabbed on the flesh side with a mixture of water and sulfated neat's-foot oil and air dried at room temperature by hanging. The shrink test before oiling was 188° F. and after oiling 182° F. The dried shearlings were satisfactory both as a leather and as a fur. They had a good feel and appearance although the leather was slightly dry, apparently needing more oil, but the grain was rather strong on both of the skins. The skins were somewhat tight, judging by fur standards, but not too full. The wool thereon was white and not harsh, and there was some evidence of the formation of a condensation product or polymer in and on the wool or hair.

Example 12.—This example was run on a somewhat smaller scale, being accomplished in a large bottle. In this bottle there were placed 100 grams of pickled goat skin, 100 cc. of water, 10 grams of salt, and 17 grams of formalin, the contents of the bottle then being run on a shaking machine for one hour, and the pH then lowered to 1.0 by the addition of sulfuric acid. It was then run during the day and allowed to set over night. It will be noticed that thus far no resorcinol had been employed, and the tanning was entirely by whatever the formaldehyde could accomplish under these acid conditions. The next morning the pH was 1.0 and the shrink test was 153° F. There were than added 7.5 grams of resorcinol and the bottle shaken all day, and allowed to set over night. By the next morning the pH of the liquor was 1.0 and the shrink test was 207° F. The skin was then neutralized, washed and fat-liquored. A sample then tested had a shrink test of 212° F. for five minutes, that is to say, the leather actually withstood a five minute boiling and even then had not shrunk. The leather was excellent, being full and mellow and entirely unlike any leather obtainable with formaldehyde alone. The shrink test also is one which is entirely unobtainable with formaldehyde alone. This test therefore definitely proves that the resorcinol in addition to any reaction it might undergo with the formaldehyde itself, plays an important part in the tanning operation when carried out in accordance with the present invention at the high hydrogen-ion concentration (low pH) which characterizes the present invention.

Example 13.—This is an example of a combination tannage in which the resorcinol-formaldehyde tannage is followed by other well known tanning operations. Raw materials: 10 pounds of shaved, pickled horse shanks. Tanning liquor, 166% water, 20% salt, 5% resorcinol, 10% formalin, all based on the weight of the raw materal as 100%. After running one hour the pH was 2.1 and the temperature 73° F. The pH was then lowered to 1.0 by the addition of 35 cc. of concentrated sulfuric acid and then run two hours after the last feed of the acid and allowed to set over night. On the following morning the material was run for thirty minutes and the pH was found to be 1.1 and the shrink test 185° F. The liquor and the hides therein were then neutralized to a pH of 2.6 with sodium acetate, whereupon 5% of basic chromium sulfate (one-bath chrome) was added, and the churn run for three hours, by which time the pH was 2.5 and the shrink test uniform at 194° F. The pieces were neutralized to a liquor pH of 4.2, washed, fat-liquored, horsed over night and air dried by hanging. The resulting leather withstood a full five minute boiling, that is to say, it neither shrank nor curled while in the boiling water for five minutes. The leather was good, and had the properties which could be expected from this combination. This example proves that the resorcinol formaldehyde tanning can be followed by chrome tanning with excellent results.

Example 14.—The horse hide leather obtained from the herein above given Example 4, was retanned with 30% of Wattle extract in 100% of liquor. After five hours of running in this liquor in the churn, the penetration was complete. The leather was washed and then re-fat-liquored, horsed, hung and dried. The leather obtained was full and mellow.

Example 15.—Raw material: 10 pounds of shaved pickled horse shanks. Tanning liquor: 2 gallons of water, 1 pound of sodium chloride, 0.5 pound resorcinol, and 1 pound 2 ounces of formalin; pH 2.0, temperature 74° F., time one hour. Thereafter there were added 1 pound of basic zirconium sulfate (Zircotan N); temperature then being 74° F., at which the churn was run for one hour, at the end of which time the temperature remained the same and the pH was 1.2. 25 cc. of concentrated sulfuric acid were then added and after one hour's running the pH had dropped to 0.8. Thereafter the churn was run for an additional two hours and then shut down for the night. On the following morning, after a thirty minute run the pH of the liquor was still 0.8, and the shrink tests on two pieces were respectively 196° F. and 201° F. The leather was then neutralized to a pH of 4.5 on the basis of the liquor, when the shrink test was found to be uniform at 207° F. The leather was then washed and fat-liquored. The leather was good, being firm and tight, but was somewhat flat.

*Example 16—Resorcinol and Acetaldehyde.*—Raw material: 100 grams of pickled goat skins. Tanning liquor: 100 cc. of water, 10 grams of salt, 7.5 grams of resorcinol and 9 grams of acetaldehyde; all run in a bottle on a shaking machine. The pH was lowered to 1.0 by the addition of 10 cc. of a 5% solution by volume of sulfuric acid with the usual running during the day and resting over night. On the following morning the pH was 0.9 and the shrink test 198° F. The skin was full and solid and very different from the pickled skin which had formed the starting material. The shrink test also indicated good tannage. The skin was neutralized, washed, fat-liquored and dried. The shrink test on the finished leather was 208° F. and the piece had all the feel and appearance of good leather, being full, mellow, and of a light, even tan color, somewhat resembling that of vegetable leather, and, except for the shrink test, quite similar to such leather.

*Example 17—Pyrogallol and Acetaldehyde.*—The experimental conditions in this example are the same as those in Example 16, except that 7.5 grams of pyrogallol and 8 grams of acetaldehyde were used. The shrink test on the first morning at a pH of 1.0 was 174° F., indicating tanning. After neutralizing, washing, fat-liquoring, and drying, the shrink test was 190° F. The leather was well tanned, although not quite as full as that of Example 16, but it would have been commercially satisfactory.

*Example 18—Pyrogallol and Furfural.*—The conditions are the same as those given in connection with Examples 16 and 17, except that 5 grams of pyrogallol and 10 grams of furfural were used. On the following morning the shrink test was 143° F. at a pH of 1.1, and 160° F. after neutralizing to a pH of 4. While there was some tanning, the leather was rather poor, being flat and tinny. This example demonstrates that while pyrogallol and acetaldehyde are highly satisfactory, this cannot be said of pyrogallol and furfural, which however still indicates that tanning is effected.

*Example 19—Resorcinol and Paraformaldehyde.*—The conditions were the same as those of Examples 16, 17 and 18, except that 7.5 grams of resorcinol and 6 grams of paraformaldehyde were used. The pH on the following morning was 0.9 and the shrink test 207° F. After neutralizing the shrink test was 212° F. for one minute, that is to say, the leather neither shrank nor curled until the water had been boiling for one full minute. The leather obtained was the same as that obtained with resorcinol and formaldehyde, which indicates that paraformaldehyde is a satisfactory form of formaldehyde or source thereof.

*Example 20—Resorcinol and Benzaldehyde.*—The conditions were the same as those in Examples 16 through 19, except that 22 cc. of benzaldehyde and 7.5 grams of resorcinol were used. On the following morning the shrink test was 174° F. at a liquor pH of 0.9. The eventually obtained dry leather was fuller than the pickled skin and fuller than it would have been if the treatment had been with formaldehyde alone. However, it was rather flat and lacking in roundness and mellowness, as compared to a tannage by means of resorcinol and formaldehyde. The example demonstrates, however, that a combination of resorcinol and benzaldehyde will tan leather.

*Example 21—Pyrogallol and Formaldehyde.*—Raw material: 10 pounds of unshaved pickled horse shanks. Tanning liquor: 2 gallons of water, 2 pounds of salt, 12 ounces of pyrogallol, and 24 ounces of formaldehyde. Material drummed in a churn for one hour, at which time the pH was 2.0. This was lowered to 1.0 with 100 cc. of concentrated hydrochloric acid. On the next morning the pH was 1.3, and the shrink test uniform at 162° F. After neutralizing, the shrink test was 194° F. The leather obtained was of a good quality, the pieces being full, mellow and tight, but the color of the leather was a blue-black after neutralizing. The leather had properties which most closely approach that of the resorcinol-formaldehyde tannage, except of course for the color.

*Example 22—Resorcinol and Furfural.*—Raw material: 10 pounds of kips. Tanning liquor: 2 gallons of water, 2 pounds of salt, ½ pound of resorcinol and 14 ounces of furfural, (which is the equivalent of 2 mols of furfural to one mol resorcinol). The material was drummed for one hour in a churn, when the pH was 2.5. The pH was lowered to 0.9 by the addition of 50 cc. of concentrated sulfuric acid, and the material allowed to set over night. On the following morning the pH was 1.2 and the shrink test 174° F. The pack was then neutralized by means of soda ash (sodium carbonate). The quality of the leather obtained was good and its color was brown. Its shrink test, even before fat-liquoring, was 190° F. and 196° F. on two separate samples. The leather had many of the properties of that tanned by means of resorcinol and formaldehyde. Note that only 5% of resorcinol and 9% of furfural were used.

*Example 23—Resorcinol and Crotonaldehyde.*—Raw material: 10 pounds of pickled goat skins (11 skins). Tanning liquor: 2 gallons of water, 2 pounds of sodium chloride, ¾ pound of resorcinol and 1½ pounds of crotonaldehyde. The materials were drummed for one hour at which time the pH was 2.1; this was then lowered to 0.9 by the addition of 75 cc. of concentrated sulfuric acid, and the material allowed to stand over night. On the following morning the pH was 0.9 and the shrink test 158° F. After neutralizing the liquor to a pH of 4, the shrink test was 172° F. While the shrink test was not as good as that obtainable by resorcinol and formaldehyde, the leather nevertheless was tanned as indicated by its feel and color.

*Example 24.*—Raw materials: 100 grams pickled goat skins. Tanning liquor: 3 grams resorcinol, 7 grams formalin, in the usual amount of salt and water, but at a pH of 0.5 over night. On the following morning, the goat skins had a shrink test of 176° F. and the liquor still had a pH of 0.5. After neutralizing, the leather had a shrink test of 199° F. The leather was good, but not quite as full as when more resorcinol had been used, but would have been entirely satisfactory for many purposes such as linings. This example demonstrates how low an amount of resorcinol and formaldehyde could be used, namely 3% to 7%, respectively, while still obtaining a good tannage in a single night's standing.

*Example 25.*—Raw material: 100 grams of pickled goat skin. Tanning liquor: 2 grams resorcinol and 4½ grams of formalin, and the usual quantity of salt and water, the tannage being accomplished at a pH of 0.5 over night. On the following morning the pH still was 0.5 and the shrink test was 163° F. After neutralizing the liquor to a pH of 4.0, the shrink test was 190° F., the leather was tanned and, considering the small amount of material used, had a good shrink test, but did not appear quite as full. The tan color of the leather showed that condensation had taken place. This final example therefore further demonstrates how small amounts of resorcinol and formaldehyde (respectively 2% and 4½%) can be used and still obtain a good tannage at a pH of 0.5 in a single night's stand.

From the above examples it will be clear that it has been fully demonstrated that polyhydric phenols such as resorcinol and pyrogallol in connection with aldehydes such as formaldehyde, polymers of formaldehyde, crotonaldehyde, benzaldehyde, and furfural may be used to good effect for tanning of various types of tannable materials. The advantages of the use of these different chemical materials as contrasted with natural tanning agents lies in the fact that it enables a better control over the properties of the product to be obtained. Furthermore, the tensile strength of the leathers obtained have been found to be better than those which were obtained by means of vegetable tanning agents alone, and appears to lie somewhat between that of vegetable tanned leather and chrome tanned leather.

Due to the fact that the materials used are watersoluble they contribute to ease of handling and the speed of penetration into the skin, hide or pelt. Re-tanning is also possible as with other types of tannages, which is a considerable advantage from a commercial point of view. The color of the leather obtained is a light tan and hence is quite desirable. The only time the leather is dark is when furfural is used or when pyrogallol is one of the tanning agents.

It should once again be emphasized that considerable acidity in the tanning liquor is necessary and that the pH may be as low as 0.3 or as high as 3.0. An interesting way of following the tannage operations is to observe the change in color of the leather. It would appear that the maximum amount of coloring is developed at the lowest pH. Thus with resorcinol at a pH below about 1, the color is a bright pink red, being more intense at a pH of 0.5 than at 1. Upon neutralization the leather turns a light tan color which is very desirable as it is the color expected by most persons in connection with vegetable tanned leather. At a somewhat higher pH (less acidity) a light or white color is obtained. The commercial applications of the present invention will be obvious to those who are familiar with tanning procedure and the applicability of the invention to a large variety of raw materials of the leather industry has been demonstrated.

While sulfuric, hydrochloric, and oxalic acids have been shown in connection with the above examples, other acids sufficiently strong to increase the hydrogen-ion concentration to the desired point (i. e. low pH) may be used. Thus phosphoric acid is satisfactory, while formic acid is too weak. When the leather is partly neutralized at the end of the reaction, and where sodium acetate, carbonate and bicarbonate are mentioned, these materials may be replaced in whole or in part by borax, ammonium bicarbonate, sodium thiosulfate (hypo), sodium formate or hexamethylene-tetramine.

Tests were also made with the present tanning methods or applied to other protein materials such for example as keratinous material and casein; particularly casein filaments which are produced by spinning casein solutions into acid baths. It was found that the insolubilization of the casein filaments when they were treated with resorcinol and formaldehyde, with pyrogallol and formaldehyde, and with resorcinol and furfural, etc., was greatly enhanced. It will be self-evident that by applying the same technique to other artifacts made of protein material, such as casein and the like, similar results can be expected. The above examples show conclusively that a combination of the hereinabove enumerated polyhydric phenols with the also hereinabove enumerated aldehydes forms a useful combination for effecting the tanning of various types of tannable material, and particularly hides, skins and pelts, with or without the hair thereon.

The invention is to be sharply contrasted from methods of impregnation of already tanned leather by means of potential resin-forming materials, which is something altogether different from tanning, and bears no real relation thereto. Applicant is aware that formaldehyde has long been used as a tanning agent and also that proposals for the use of resorcinol and aldehyde have been made, but without giving any directions for their method of application, the amounts to be used, and particularly without pointing out the essential necessity of carrying out the reaction in a highly acidic aqueous medium having a pH within the range of from about 0.3 to about 3.0.

Accordingly applicant claims:

1. Process of tanning which comprises subjecting a tannable protein material to the action of an aqueous solution containing both a free polyhydric phenol from the group consisting of resorcinol and pyrogallol and a free aldehyde from the group consisting of formaldehyde, furfural, benzaldehyde and crotonaldehyde, the relative proportions of said phenol and said aldehyde being such that there are present in said solution at least two mols of the aldehyde to each mol of the phenol, the hydrogen-ion concentration of the solution being adjusted to and maintained during the tanning action within the range of from about pH 0.3 to about pH 3.0.

2. Process of tanning skins and hides which comprises subjecting an animal skin or hide to the action of an aqueous solution containing both a free polyhydric phenol from the group consisting of resorcinol and pyrogallol and a free aldehyde from the group consisting of formaldehyde, furfural, benzaldehyde and crotonaldehyde, the relative proportions of said phenol and said aldehyde being such that there are present in said solution at least two mols of the aldehyde to each mol of the phenol, the hydrogen-ion concentration of the solution being adjusted to and maintained during the tanning action within the range of from about pH 0.3 to about pH 3.0.

3. The process as defined in claim 2, in which the polyhydric phenol is resorcinol and the aldehyde is formaldehyde.

4. The process as defined in claim 3 in which the molar ratio of the formaldehyde to the resorcinol is within the range of from about 2:1 to about 6:1.

5. The process as defined in claim 4 in which the amount of the resorcinol is within the range of from about 1% to about 10% on the wet weight of the skin or hide.

6. The process as defined in claim 5 in which the hydrogen-ion concentration of the solution is about pH 0.5.

WALLACE WINDUS.

REFERENCES CITED

The following references are of record in the file of this patent:

UNITED STATES PATENTS

| Number | Name | Date |
|---|---|---|
| 1,232,620 | Stiasny | July 10, 1907 |
| 1,395,733 | Römer | Nov. 1, 1921 |
| 1,912,593 | Pollak | June 6, 1933 |

FOREIGN PATENTS

| Number | Country | Date |
|---|---|---|
| 4,605 | Great Britain | 1907 |
| 477,517 | Great Britain | Dec. 30, 1937 |
| 346,197 | Germany | Dec. 27, 1921 |

OTHER REFERENCES

"The Chemistry of Leather Manufacture"—J. A. Wilson, vol. II Second Ed., The Chemical Catalog Co., Inc., N. Y. C., 1929 page 765 (copy in Div. 43).